US 12,054,189 B2

(12) United States Patent
Fujii et al.

(10) Patent No.: US 12,054,189 B2
(45) Date of Patent: Aug. 6, 2024

(54) STEERING WHEEL

(71) Applicant: KABUSHIKI KAISHA TOKAI-RIKA-DENKI-SEISAKUSHO, Aichi-ken (JP)

(72) Inventors: Takahiro Fujii, Aichi (JP); Hiroshi Ohira, Aichi (JP); Yasumasa Kondo, Aichi (JP); Hiroshi Takeoka, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 18/097,684

(22) Filed: Jan. 17, 2023

(65) Prior Publication Data

US 2023/0278619 A1 Sep. 7, 2023

(30) Foreign Application Priority Data

Jan. 19, 2022 (JP) .................. 2022-006676

(51) Int. Cl.
*B62D 1/04* (2006.01)
*B62D 1/06* (2006.01)
*G01V 3/08* (2006.01)

(52) U.S. Cl.
CPC .............. *B62D 1/046* (2013.01); *B62D 1/06* (2013.01); *G01V 3/088* (2013.01)

(58) Field of Classification Search
CPC . B62D 1/04; B62D 1/06; B62D 1/065; B62D 1/08; B62D 1/10; B62D 1/046; G01V 3/088
See application file for complete search history.

(56) References Cited

U.S. PATENT DOCUMENTS

| 6,065,366 A | * | 5/2000 | Koyama | B62D 1/06 |
| | | | | 428/317.1 |
| 10,308,273 B2 | * | 6/2019 | Naitou | B62D 1/065 |
| 10,677,950 B2 | * | 6/2020 | Nishio | G01V 3/06 |
| 11,145,996 B2 | * | 10/2021 | Yamashita | H01R 4/06 |
| 11,565,738 B2 | * | 1/2023 | Zoppas | B62D 1/046 |
| 2002/0008097 A1 | * | 1/2002 | Hobby | B62D 1/065 |
| | | | | 219/476 |

(Continued)

FOREIGN PATENT DOCUMENTS

| CN | 115038631 A | * | 9/2022 | |
| DE | 202005020936 U1 | * | 11/2006 | ............... H05B 3/34 |

(Continued)

OTHER PUBLICATIONS

Machine Translation of JP-2019202446-A.*
Machine Translation of DE-102017111297-A1.*
Machine Translation of CN-115038631-A.*

*Primary Examiner* — Adam D Rogers
(74) *Attorney, Agent, or Firm* — Dority & Manning, P.A.

(57) ABSTRACT

A steering wheel including: a detecting portion wound on a base portion that has a concave groove portion, the detecting portion being configured to detect contact of a person; an electrode that is sheet-shaped, the electrode structuring the detecting portion; and a convex portion formed at a side of the concave groove portion of the electrode, the convex portion projecting-out in a width direction of the electrode.

6 Claims, 8 Drawing Sheets

(56) References Cited

U.S. PATENT DOCUMENTS

| | | | | |
|---|---|---|---|---|
| 2002/0033389 | A1* | 3/2002 | Sugiyama | H05B 3/34 |
| | | | | 219/548 |
| 2014/0224040 | A1* | 8/2014 | Van'tZelfde | B62D 1/046 |
| | | | | 73/862.381 |
| 2015/0048845 | A1* | 2/2015 | Petereit | G01R 27/2605 |
| | | | | 324/663 |
| 2016/0236702 | A1* | 8/2016 | Lammers | B26D 7/086 |
| 2017/0282955 | A1* | 10/2017 | Morita | B62D 1/065 |
| 2017/0334477 | A1* | 11/2017 | Bossler | G01D 5/2417 |
| 2018/0229752 | A1* | 8/2018 | Chascsa, II | B60K 35/00 |
| 2018/0251146 | A1* | 9/2018 | Boittiaux | B62D 1/10 |
| 2018/0348392 | A1* | 12/2018 | Nishio | B62D 1/046 |
| 2019/0241204 | A1* | 8/2019 | Uematsu | B62D 1/065 |
| 2019/0291770 | A1* | 9/2019 | Uematsu | B62D 1/06 |
| 2019/0378637 | A1* | 12/2019 | Rispoli | H01C 3/12 |
| 2020/0001911 | A1* | 1/2020 | Card | B32B 7/05 |
| 2020/0391616 | A1* | 12/2020 | Wilson | G01D 5/2417 |
| 2021/0036438 | A1* | 2/2021 | Yamashita | H01R 4/06 |
| 2021/0276604 | A1* | 9/2021 | Kondo | B62D 1/04 |
| 2021/0300454 | A1* | 9/2021 | Hotta | C09D 11/52 |
| 2022/0135110 | A1* | 5/2022 | Shinmen | B32B 27/12 |
| | | | | 74/552 |
| 2022/0388562 | A1* | 12/2022 | Yamada | B62D 1/065 |
| 2023/0097013 | A1* | 3/2023 | Fujii | G01V 3/088 |
| | | | | 324/663 |
| 2023/0104284 | A1* | 4/2023 | Fujii | G01L 5/221 |
| | | | | 74/552 |
| 2023/0115493 | A1* | 4/2023 | Fujii | B62D 1/046 |
| | | | | 324/663 |

FOREIGN PATENT DOCUMENTS

| | | | | |
|---|---|---|---|---|
| DE | 102012214752 A1 | * | 2/2014 | B62D 1/065 |
| DE | 102017111297 A1 | * | 6/2018 | |
| JP | 2019202446 A | * | 11/2019 | |
| JP | 2021140951 A | | 9/2021 | |
| KR | 20110134794 A | * | 12/2011 | |
| KR | 20130065555 A | * | 6/2013 | |

* cited by examiner

STEERING WHEEL

CROSS-REFERENCE TO RELATED APPLICATION

This application is based on and claims priority under 35 USC 119 from Japanese Patent Application No. 2022-006676 filed on Jan. 19, 2022, the disclosure of which is incorporated by reference herein.

BACKGROUND

Technical Field

The present disclosure relates to a steering wheel.

Related Art

The technique of providing a sensor, which detects contact of the hands of a passenger with a steering wheel, at a vehicle such as an automobile or the like is known (for example, Japanese Patent Application Laid-Open (JP-A) No. 2021-140951).

JP-A No. 2021-140951 discloses a steering wheel in which a sensor, which has a sensor electrode serving as a conductive fabric, is affixed to the outer periphery of a rim metal core.

By the way, it is preferable to improve the touch sensitivity that is sensed by the detecting portion at such a steering wheel.

SUMMARY

In view of the above-described circumstances, an object of the present disclosure is to provide a steering wheel in which the touch sensitivity that is sensed by a detecting portion can be improved.

A steering wheel of a first aspect of the present disclosure includes: a detecting portion wound on a base portion that has a concave groove portion, and detecting contact of a person; an electrode that is sheet-shaped and structures the detecting portion; and a convex portion formed at a side of the concave groove portion of the electrode, and projecting-out in a width direction of the electrode.

In a steering wheel of a second aspect of the present disclosure, in the steering wheel of the first aspect of the present disclosure, the convex portion is formed adjacent to the concave groove portion.

In a steering wheel of a third aspect of the present disclosure, in the steering wheel of the first aspect or the second aspect of the present disclosure, the convex portions are provided at both sides of the concave groove portion.

In a steering wheel of a fourth aspect of the present disclosure, the steering wheel of the third aspect of the present disclosure includes an intermediate portion that is provided at the electrode between the convex portions, and whose width is wider than a width of the convex portion at a side opposite the concave groove portion.

In the steering wheel of the first aspect of the present disclosure, due to the convex portion, which projects-out in the width direction of the electrode, being formed at a side of the concave groove portion of the electrode, the surface area of the electrode at the side of the concave groove portion is enlarged. Therefore, the decreased touch sensitivity at the concave groove portion can be supplemented at the side of the concave groove portion. As a result, in the range that includes the concave groove portion, the touch sensitivity that is sensed by the detecting portion can be improved.

In the steering wheel of the second aspect of the present disclosure, due to the convex portion being formed adjacent to the concave groove portion, the convex portion is a guide. Therefore, the detecting portion can be wound on the base portion by using the convex portion as a guide.

In the steering wheel of the third aspect of the present disclosure, due to the convex portions being provided at the both sides of the concave groove portion, the surface area of the electrode at the sides of the concave groove portion is further enlarged. Therefore, in the range that includes the concave groove portion, the touch sensitivity that is sensed by the detecting portion can be improved more.

In the steering wheel of the fourth aspect of the present disclosure, due to the intermediate portion, whose width is wider than the width of the convex portion at the side opposite the concave groove portion, being provided at the electrode between the convex portions, it is difficult for the intermediate portion to stretch in the length direction of the detecting portion. Therefore, it can be made such that the intermediate portion does not stiffen. As a result, the work of placing the intermediate portion within the concave groove portion is easy. Therefore, the workability of winding the detecting portion onto the base portion can be improved.

BRIEF DESCRIPTION OF THE DRAWINGS

Exemplary embodiments of the present disclosure will be described in detail based on the following figures, wherein.

DETAILED DESCRIPTION

First Embodiment

A steering wheel relating to a first embodiment is described hereinafter with reference to the drawings. In the first embodiment, description is given of an example in which a detecting portion provided at a steering wheel 20 of the present disclosure is structured as electrostatic capacitance sensors (hereinafter called sensors) 50A that detect the touch of a person.

Note that, in the respective drawings, arrow RH indicates the rightward direction of the steering wheel 20, and arrow UP indicates the upward direction of the steering wheel 20. Further, in the respective drawings, arrow E indicates the length direction of the sensor 50A, arrow W indicates the width direction of the sensor 50A, and arrow F indicates the thickness direction of the sensor 50A.

[Structure of Steering Wheel]

Figure 1:
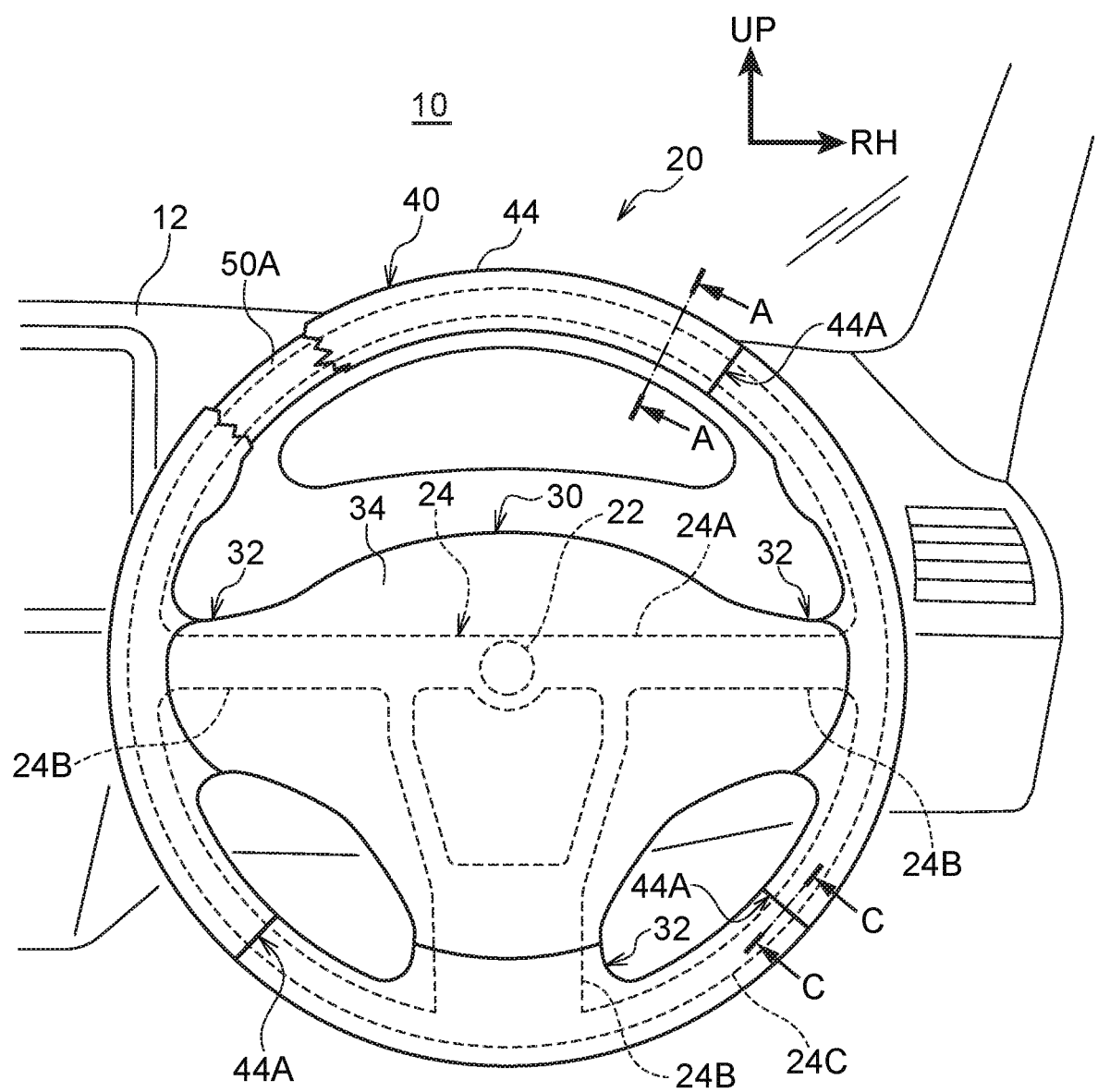
FIG. 1 is a front view illustrating a steering wheel relating to a first embodiment.

As illustrated in FIG. 1, the steering wheel 20 relating to the first embodiment is disposed at the vehicle rear side of an instrument panel 12 that is provided at the front side of the vehicle cabin interior of a vehicle 10. The steering wheel 20 is provided in a posture in which the front surface thereof faces the vehicle rear side. The vehicle 10 is steered due to a driver seated in the driver's seat operating the steering wheel 20.

The steering wheel 20 has a rim portion 40 formed in an annular shape, a boss portion 30 disposed at the radial direction inner side of the rim portion 40, and three spoke portions 32 connecting the rim portion 40 and the boss portion 30.

As seen in a front view of the steering wheel 20, the rim portion 40 is formed in an annular shape, and is grasped by the driver who is seated in the driver's seat, at the time when the driver steers the vehicle 10. As seen in a front view of the steering wheel 20, the boss portion 30 is disposed at the substantial center of the steering wheel 20. The spoke portions 32 are formed so as to extend rightward, leftward and downward from the boss portion 30 toward the rim portion 40.

As illustrated in FIG. 1, a metal core 24 that is made of metal and serves as a frame member is provided at the steering wheel 20. The metal core 24 has a boss metal core 24A of the boss portion 30, spoke metal cores 24B of the spoke portions 32, and a rim metal core 24C of the rim portion 40.

The boss metal core 24A is formed in the shape of a plate, and is fixed to the distal end of a steering shaft 22 that is connected to an unillustrated steering mechanism. The boss metal core 24A forms the frame of the boss portion 30.

Figure 2:
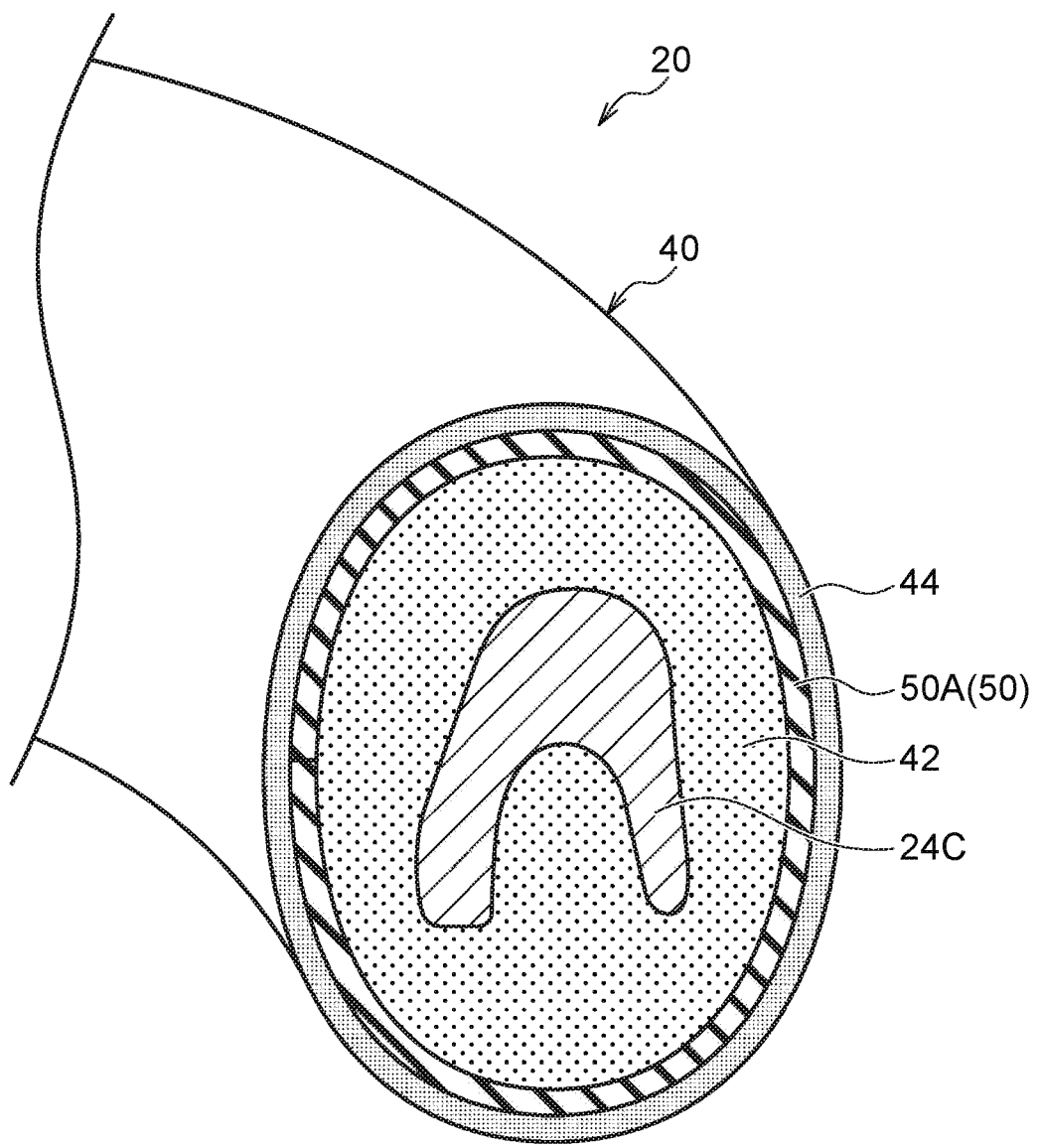
FIG. 2 is a cross-sectional view illustrating the steering wheel relating to the first embodiment, and illustrates the A-A cross-section of FIG. 1.

The rim metal core 24C is formed in an annular shape as seen in a front view of the steering wheel 20. As illustrated in FIG. 2, the rim metal core 24C is formed in a substantial U shape as seen in a cross-section in the radial direction of the rim metal core 24C (the A-A cross-section of FIG. 1). The rim metal core 24C forms the frame of the rim portion 40.

As illustrated in FIG. 1, the spoke metal cores 24B are formed in the shapes of plates, and connect the boss metal core 24A and the rim metal core 24C. The spoke metal cores 24B form the frames of the spoke portions 32.

A covering member 34 is mounted to the boss metal core 24A and the spoke metal cores 24B. The covering member 34 can be formed of resin. The covering member 34 is formed so as to cover the front sides of the boss metal core 24A and the spoke metal cores 24B.

The steering wheel 20 is supported so as to be able to rotate integrally with the steering shaft 22. Due to the driver who is seated in the driver's seat grasping the rim portion 40 and rotatingly operating the steering wheel 20 in the peripheral direction thereof, the steering shaft 22 is rotated, and the vehicle 10 is steered.

(Rim Portion)

As illustrated in FIG. 2, the rim portion 40 has the rim metal core 24C and an inner member 42 that serve as the base portion, the sensors 50A, and skins 44 serving as decorative portions.

<Inner Member 42>

The inner member 42 is formed of a soft resin (e.g., polyurethane), and is formed so as to cover the entire outer periphery of the rim metal core 24C. In a cross-section in the radial direction of the rim metal core 24C, the inner member 42 is formed so as to cover the entire periphery of the rim metal core 24C. The outer shape of the inner member 42 is formed in a substantially circular shape, in a cross-section in the radial direction of the rim metal core 24C.

Figure 3:
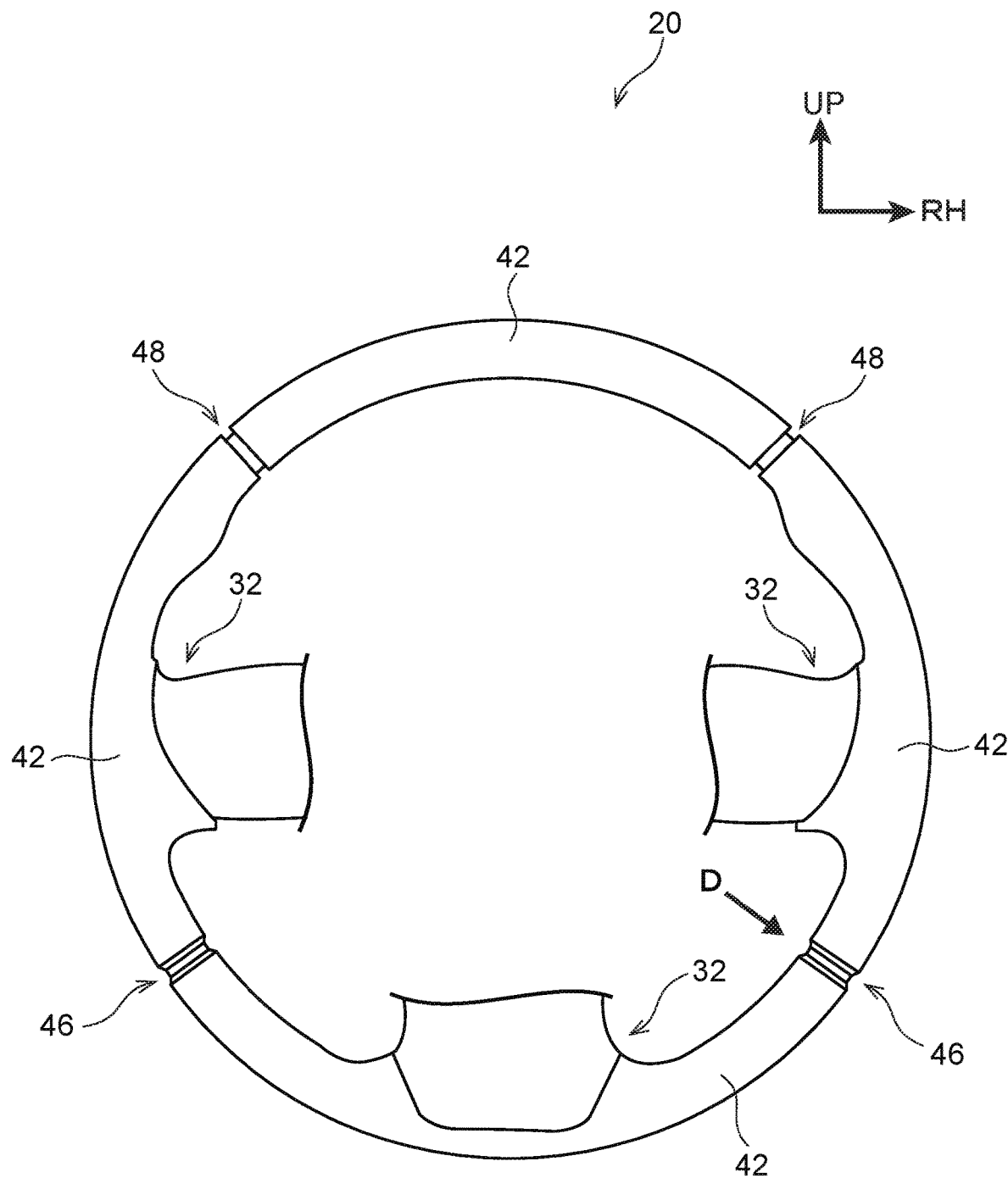
FIG. 3 is a front view illustrating a base portion of the steering wheel relating to the first embodiment.

As illustrated in FIG. 3, as seen in a front view of the steering wheel 20, the inner member 42 has first concave groove portions 46 serving as concave groove portions and located in the 4 o'clock and 8 o'clock directions, and second concave groove portions 48 serving as concave groove portions and located in the 2 o'clock and 10 o'clock directions.

Figure 6:
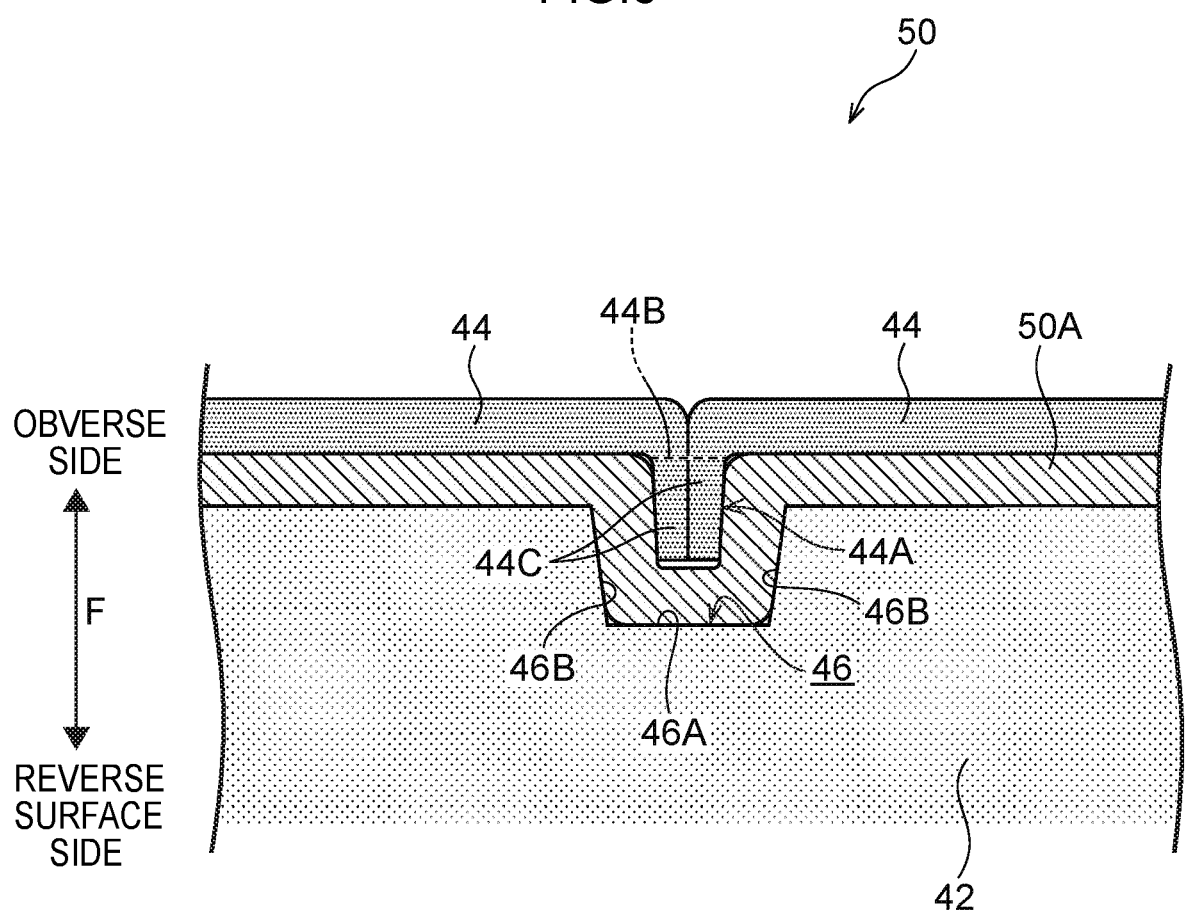
FIG. 6 is a cross-sectional view illustrating the steering wheel relating to the first embodiment, and illustrates the C-C cross-section of FIG. 1.

As illustrated in FIG. 6, the first concave groove portion 46 is formed by a bottom portion 46A and side wall portions 46B, in the form of a groove that is concave toward the radial direction inner side of the inner member 42. The first concave groove portion 46 is formed in the form of a ring that extends along the peripheral direction. The second concave groove portions 48 can be structured substantially similarly to the first concave groove portions 46. The second concave groove portions 48 can be formed as grooves that are slightly narrower than the first concave groove portions 46.

<Sensors 50A>

As illustrated in FIG. 2 and FIG. 3, the sensors 50A are formed in the shapes of sheets and are wound on the inner member 42 from the outer periphery (the outer peripheral edge) toward the inner periphery (the inner peripheral edge) of the inner member 42.

The sensors 50A are disposed respectively at the right side portion and the left side portion of the rim portion 40. The upper end of the sensor 50A at the right side portion is inserted in the second concave groove portion 48, and this sensor 50A spans over the first concave groove portion 46, and the lower end thereof is disposed in the 6 o'clock direction. The upper end of the sensor 50A at the left side portion is inserted in the second concave groove portion 48, and this sensor 50A spans over the first concave groove portion 46, and the lower end thereof is disposed in the 6 o'clock direction.

The sensor 50A disposed at the right side portion of the rim portion 40 and the sensor 50A disposed at the left side portion of the rim portion 40 are structured similarly except for being formed so as to have left-right symmetry. Therefore, hereinafter, the sensor 50A disposed at the right side portion of the rim portion 40 is described.

Figure 4:
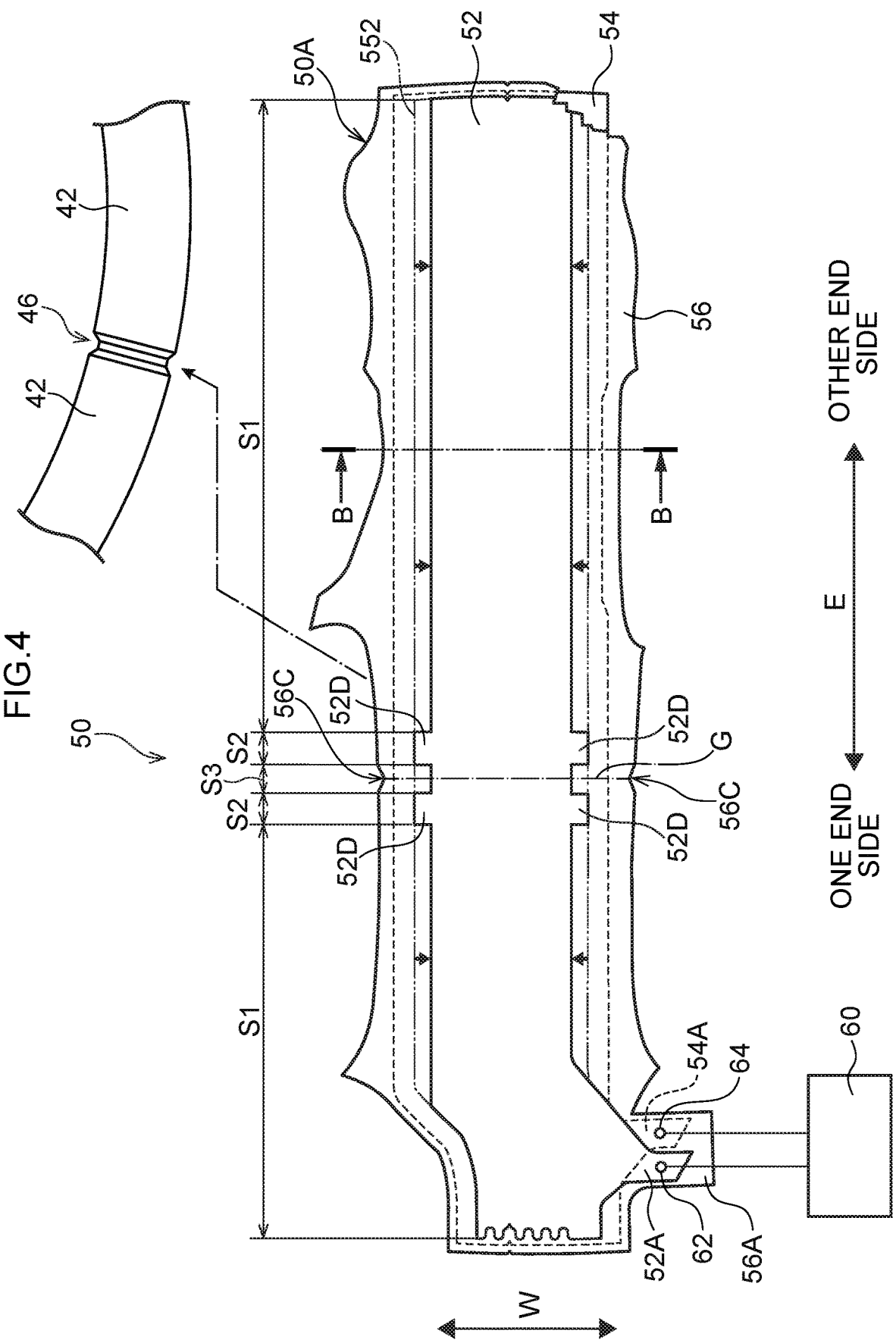
FIG. 4 is an expanded view in which a detecting portion relating to the first embodiment is seen from the obverse side.
Figure 5:
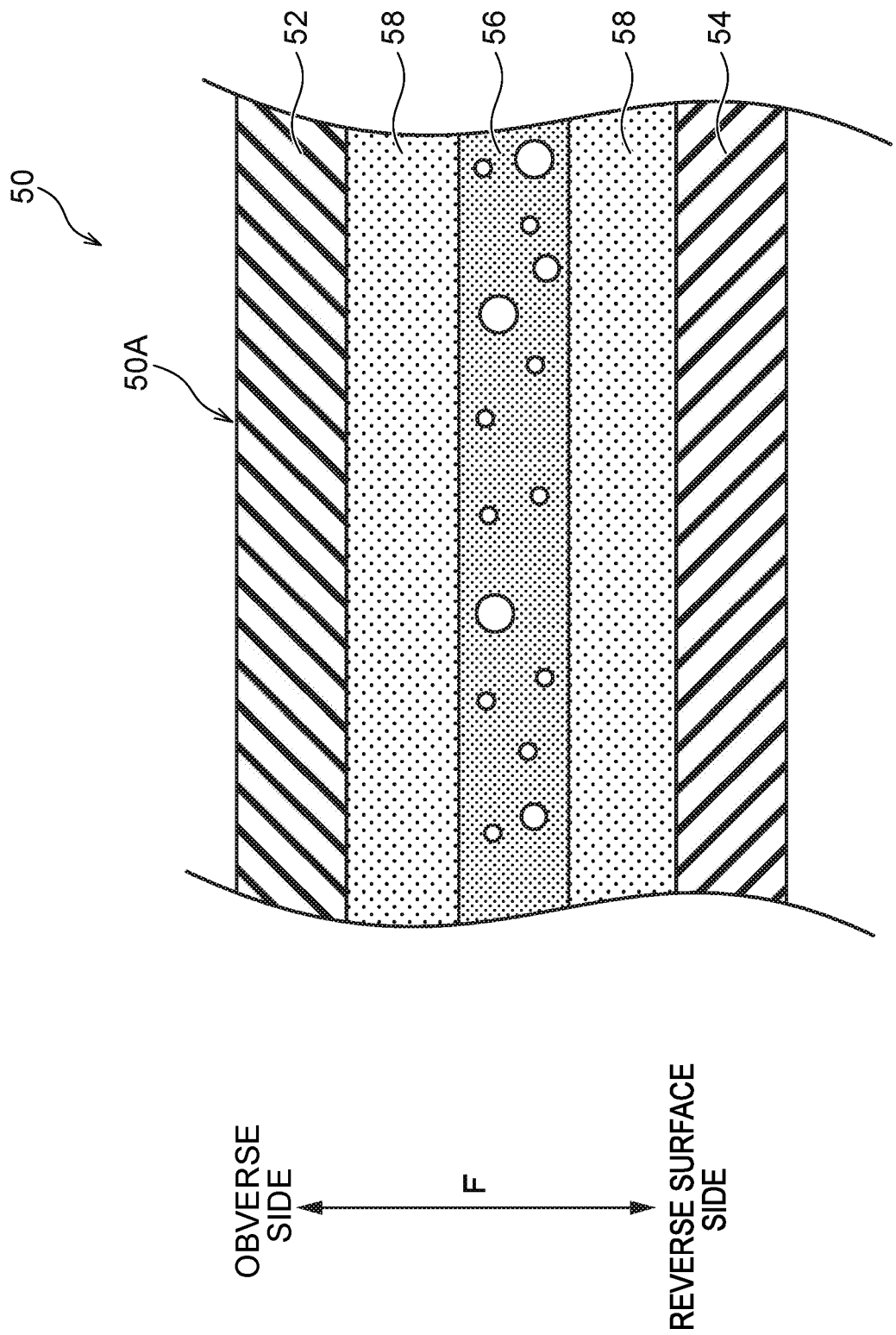
FIG. 5 is a cross-sectional view schematically illustrating the detecting portion relating to the first embodiment, and illustrates the B-B cross-section of FIG. 4.

As illustrated in FIG. 4, the sensor 50A is formed in the shape of an elongated sheet that is substantially rectangular. As illustrated in FIG. 4 and FIG. 5, the sensor 50A has a foamed body 56 serving as a first insulating body, a sensor electrode 52 serving as an electrode and disposed at the obverse side of the foamed body 56, and a cancel electrode 54 serving as an electrode and disposed at the reverse surface side of the foamed body 56.

<<Foamed Body 56>>

As illustrated in FIG. 4 and FIG. 5, the foamed body 56 is formed in the shape of an elongated sheet that is substantially rectangular. The foamed body 56 can be made to be an elastically extensible foamed body (e.g., formed rubber). The foamed body 56 is formed of an electrically insulating material, and electrically insulates the sensor electrode 52 and the cancel electrode 54.

An extending portion 56A that extends in a width direction W is formed from the outer peripheral edge of a vicinity of one end in length direction E of the foamed body 56. Cut-outs 56C may be formed in the peripheral edge of the portion of the foamed body 56 corresponding to an intermediate portion S3 that is described later.

<<Sensor Electrode 52>>

As illustrated in FIG. 4 and FIG. 5, the sensor electrode 52 is formed in the shape of an elongated sheet that is substantially rectangular and is a size smaller than the foamed body 56, and is disposed at the obverse side of the foamed body 56. The sensor electrode 52 is provided further toward the inner side in the in-plane direction than the outer peripheral edge of the foamed body 56. The portions, other than a first extending portion 52A that is described later, of the sensor electrode 52 are provided further toward the inner side in the in-plane direction than the outer peripheral edge of the cancel electrode 54. The sensor electrode 52 can be a conductive fabric that is electrically conductive and at which metal plating processing has been carried out on the surface of a fiber fabric that is extensible.

As illustrated in FIG. 4, the sensor electrode 52 has general portions S1, wide portions S2, and the intermediate portion S3.

The general portions S1 are provided from the one end side in the length direction E to one of the wide portions S2, and from another end side in the length direction E to the another wide portion S2. The width of the general portion S1 in the width direction W is formed to be narrower than that of a conventional sensor electrode 552.

Figure 7:
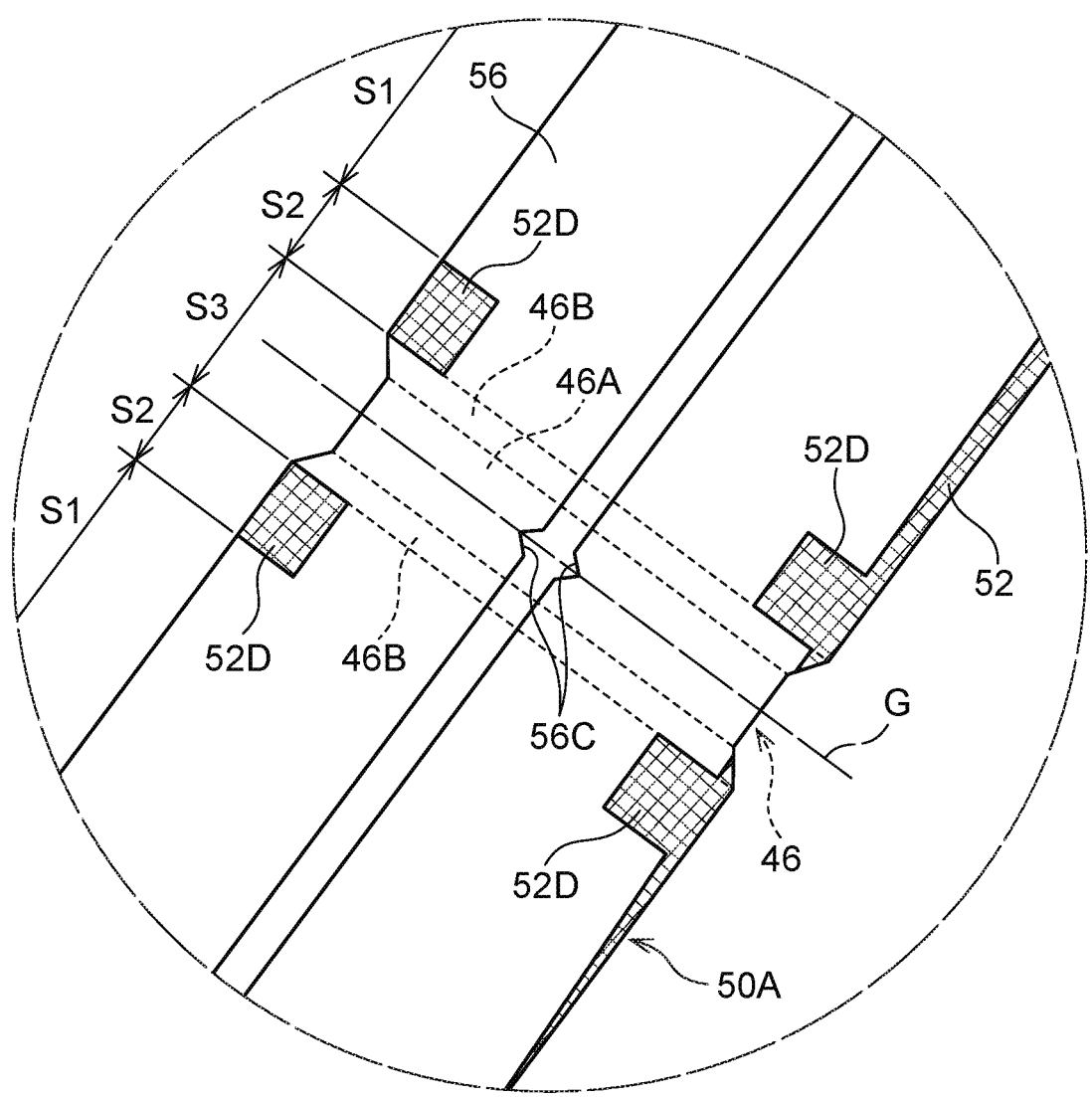
FIG. 7 is an arrow diagram illustrating, in an enlarged manner, a portion of the steering wheel relating to the first embodiment, as viewed in the direction of arrow D of FIG. 3.

As illustrated in FIG. 4 and FIG. 7, the wide portions S2 are provided at the both sides of the intermediate portion S3 such that the intermediate portion is sandwiched therebetween. Convex portions 52D, which project out in rectangular forms at both sides in the width direction W of the sensor electrode 52, are formed at the wide portions S2. The convex portions 52D are formed at the sides of the first concave groove portion 46, and can be formed to be adjacent to the first concave groove portion 46. The convex portions 52D can be formed to project-out along the edges of the first concave groove portion 46. The convex portions 52D are provided at the both sides of the first concave groove portion 46 so as to sandwich the first concave groove portion 46 therebetween.

The intermediate portion S3 is formed between the wide portions S2, and is formed between the convex portions 52D in the length direction E. The width of the intermediate portion S3 in the width direction W is formed to be narrower than that of the wide portions S2, and is formed so as to be substantially the same width as that of the general portions S1. Center G of the intermediate portion S3 in the length direction E is disposed at the substantial center of the first concave groove portion 46.

The first extending portion 52A, which extends-out in the width direction W from the outer peripheral edge of a vicinity of the one end of the sensor electrode 52 in the length direction E, is formed at the sensor electrode 52.

<<Cancel Electrode 54>>

As illustrated in FIG. 4 and FIG. 5, the cancel electrode 54 is formed in the shape of an elongated sheet that is substantially rectangular, and is smaller than the foamed body 56 and a size larger than the sensor electrode 52, and is disposed at the reverse surface side of the foamed body 56. The cancel electrode 54 is provided further toward the inner side in the in-plane direction than the outer peripheral edge of the foamed body 56.

The cancel electrode 54 can be a conductive fabric that is electrically conductive and at which metal plating processing has been carried out on the surface of a fiber fabric that is extensible. A second extending portion 54A, which extends-out in the width direction W from the outer peripheral edge of a vicinity of the one end of the cancel electrode 54 in the length direction E, is formed at the cancel electrode 54.

<<Hot Melt Bodies 58>>

As illustrated in FIG. 5, hot melt bodies 58 are interposed between the sensor electrode 52 and the foamed body 56, and between the cancel electrode 54 and the formed body 56. The hot melt bodies 58 are formed by a hot melt material that is electrically insulating.

<<Terminals>>

As illustrated in FIG. 4, a first terminal 62 made of metal is provided at the first extending portion 52A of the sensor electrode 52. The first terminal 62 is formed by the first extending portion 52A of the sensor electrode 52 and the extending portion 56A of the foamed body 56 being riveted and caulked together in a state of being affixed to one another. The first terminal 62 is electrically connected to a control device 60.

A second terminal 64 made of metal is provided at the second extending portion 54A of the cancel electrode 54. The second terminal 64 is formed by the second extending portion 54A of the cancel electrode 54 and the extending portion 56A of the foamed body 56 being riveted and caulked together in a state of being affixed to one another. The second terminal 64 is electrically connected to the control device 60. The sensors 50A and the control device 60 structure a detecting device 50. Note that the control device 60 may be provided at the steering wheel 20, or may be provided at another part.

<Skins 44>

The skins 44 are covered on the entire outer periphery of the rim portion 40, so as to cover the sensors 50A. As illustrated in FIG. 6, a spliced portion 44A is formed at the skins 44. The spliced portion 44A is formed by final end portions 44C of the two skins 44 being joined together by sewing thread 44B. The spliced portion 44A is wound on the inner member 42 so as to be inserted in the first concave groove portion 46. The spliced portion 44A is wound on so as to be inserted in the concave groove that is formed due to the sensor 50A, which has been wound on the inner member 42, being placed within the first concave groove portion 46.

[Operation of First Embodiment]

Operation of the first embodiment is described next.

At the steering wheel 20 of the above-described structure, at the time when a passenger grasps the rim portion 40 of the steering wheel 20 and a hand of the passenger contacts the skin 44, at the control device 60, the electrostatic capacitance arising between the hand of the passenger and the sensor electrode 52 is detected, and grasping of the rim portion 40 by the passenger (the contact of the hand with the skin 44) is detected. Further, the sensor electrode 52 and the cancel electrode 54 are controlled to the same potential by the control device 60. Due thereto, the generation of parasitic capacitance between the sensor electrode 52 and the rim metal core 24C is restricted. Therefore, the electrostatic capacitance that arises between the hand of the passenger and the sensor electrode 52 varying due to parasitic capacitance between the sensor electrode 52 and the rim metal core 24C is suppressed, and a deterioration in the accuracy of detecting grasping of the rim portion 40 by the passenger is suppressed.

The steering wheel 20 of the first embodiment has: the sensors 50A that are wound on the rim metal core 24C and the inner member 42 of the steering wheel 20 having the first concave groove portions 46, and that detect contact of a person with the steering wheel 20; the skins 44 that are wound on the sensors 50A, which have been wound on the rim metal core 24C and the inner member 42, such that the spliced portions 44A are inserted in the first concave groove portions 46; and the sensor electrodes 52 that are sheet-shaped and structure the sensors 50A. The steering wheel 20 has the convex portions 52D that are formed at the sides of the first concave groove portions 46 of the sensor electrodes 52 and project-out in the width direction W of the sensor electrodes 52.

By the way, the closer the distance between the sensor electrode 52 and the human body that contacts the skin 44, the higher the touch sensitivity (electrostatic capacitance) sensed by the sensor 50A. Here, at the first concave groove portion 46, due to the sensor 50A being inserted in the first concave groove portion 46, the distance between the sensor electrode 52 and the human body that contacts the skin 44 is far. Therefore, at the first concave groove portion 46, the touch sensitivity that is sensed by the sensor 50A is low.

In the first embodiment, the convex portions 52D that project-out in the width direction W of the sensor electrode 52 are formed at the sides of the first concave groove portion 46 of the sensor electrode 52. Due thereto, the surface area of the sensor electrode 52 at the sides of the first concave groove portion 46 is enlarged. Therefore, the decreased touch sensitivity at the first concave groove portion 46 can be supplemented at the sides of the first concave groove portion 46. As a result, the touch sensitivity sensed by the sensor 50A can be improved in the range that includes the first concave groove portion 46.

Further, the convex portions 52D make the width of the sensor electrode 52 wider at the sides of the first concave groove portion 46. On the other hand, at the general portions S1 of the sensor electrode 52, the width in the width direction W is narrowed within a range in which the touch sensitivity is established. Due thereto, it is easy for the sensor 50A to stretch in the length direction E. Therefore, the workability at the time of the winding the sensor 50A onto the rim metal core 24C and the inner member 42 can be improved.

At the steering wheel 20 of the first embodiment, the convex portions 52D are formed adjacent to the first concave groove portion 46.

A mark-off line is drawn at the sensor 50A in order to wind the skin 44 onto the sensor 50A, which has been wound on the rim metal core 24C and the inner member 42, such that the spliced portion 44A is inserted in the first concave groove portion 46.

In the first embodiment, by forming the convex portions 52D adjacent to the first concave groove portion 46, the convex portions 52D become guides. Therefore, by using the convex portions 52D as guides, the skin 44 can be wound on the sensor 50A that has been wound on the rim metal core 24C and the inner member 42. As a result, without providing a mark-off line, the skin 44 can be wound so as to align with the intended position, on the sensor 50A that has been wound on the rim metal core 24C and the inner member 42.

Moreover, by using the convex portions 52D as guides, the sensor 50A can be wound on the rim metal core 24C and the inner member 42 such that the convex portions 52D are adjacent to the first concave groove portion 46. Thus, the sensor 50A can be wound on the rim metal core 24C and the inner member 42, so as to align with the intended position.

At the steering wheel 20 of the first embodiment, the convex portions 52D are provided at the both sides of the first concave groove portion 46.

By providing the convex portions 52D at the both sides of the first concave groove portion 46, the surface area of the sensor electrode 52 at the sides of the first concave groove portion 46 is further enlarged. Therefore, the touch sensitivity sensed by the sensor 50A can be further improved in the range that includes the first concave groove portion 46.

The steering wheel 20 of the first embodiment has the detecting device 50, the rim metal core 24C on which the sensors 50A of the detecting device 50 are wound, and the skins 44 that cover the sensors 50A that are wound on the rim metal core 24C.

Even at the time when the passenger grasps the steering wheel 20 with his/her hand, the touch sensitivity sensed by the sensor 50A can be improved in the range that includes the first concave groove portion 46. Therefore, the decreased touch sensitivity at the first concave groove portion 46 can be supplemented at the sides of the first concave groove portion 46. As a result, the touch sensitivity of the steering wheel 20 can be improved.

Second Embodiment

The steering wheel of the second embodiment differs from the steering wheel of the first embodiment with respect to the point that the structure of the intermediate portion is different.

The structure of the steering wheel of the second embodiment is described hereinafter. Note portions of the same or similar contents as those of the first embodiment are described by using the same terms and reference numerals.

Figure 8:
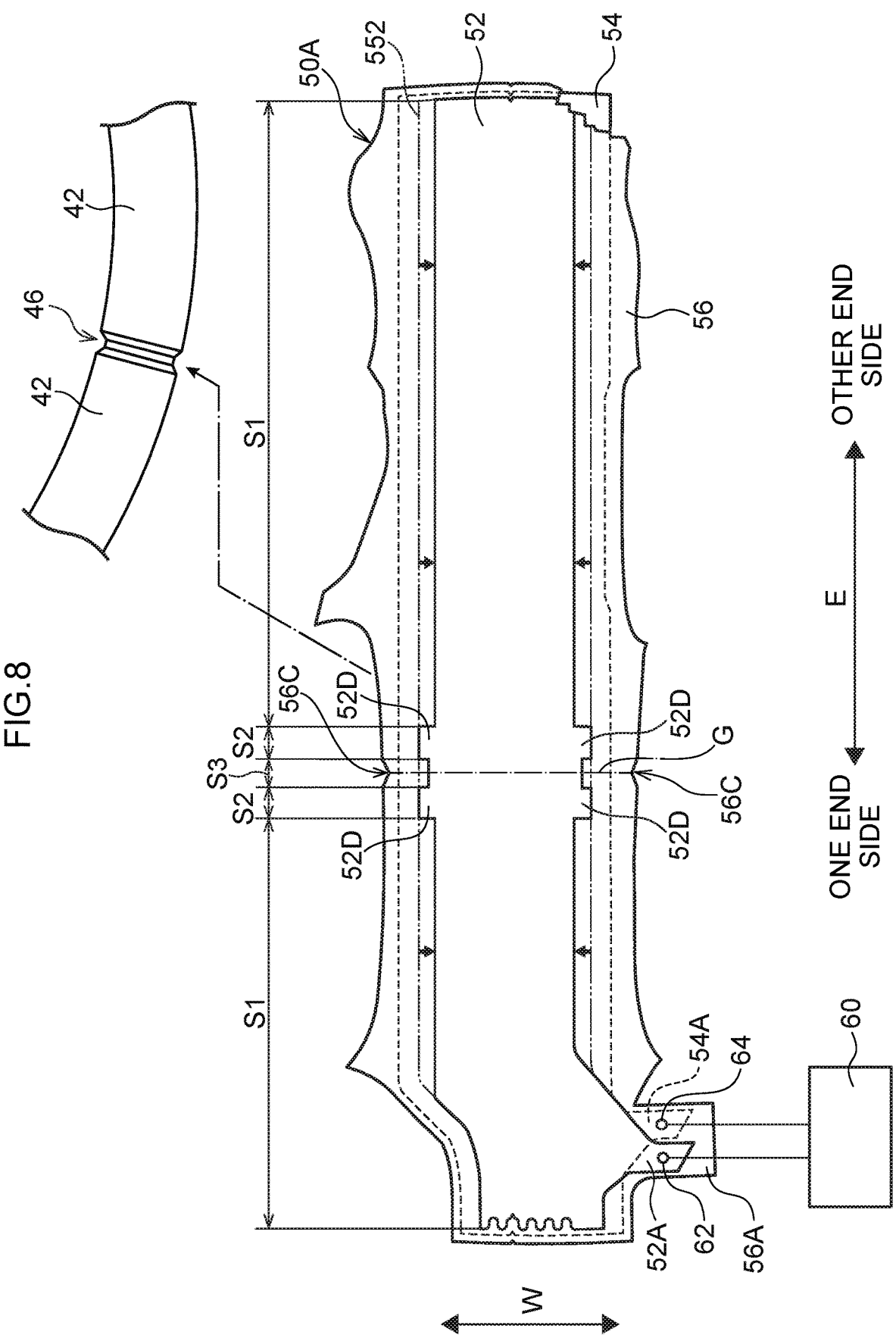
FIG. 8 is an expanded view in which a detecting portion relating to a second embodiment is seen from the obverse side.

In the second embodiment, as illustrated in FIG. 8, the intermediate portion S3 is formed between the wide portions S2. The intermediate portion S3 is formed between the convex portions 52D in the length direction E. The width of the intermediate portion S3 in the width direction W is formed to be narrower than that of the wide portions S2, and is formed to be wider than that of the general portions S1. In other words, the width of the intermediate portion S3 in the width direction W is formed to be wider than the width of the convex portion 52D at the side opposite the first concave groove portion 46.

[Operation of Second Embodiment]

Operation of the second embodiment is described next.

At the steering wheel 20 of the second embodiment, the intermediate portion S3, whose width is wider than that of the general portions S1 of the sensor electrode 52, is provided between the convex portions 52D.

By providing the intermediate portion S3, whose width is wider than that of the general portions S1 of the sensor electrode 52, between the convex portions 52D, it is difficult for the intermediate portion S3 to stretch in the length direction E of the sensor 50A. Therefore, it can be made such that the intermediate portion S3 does not stiffen. As a result, the work of placing the intermediate portion S3 into the first concave groove portion 46 is easy. Therefore, the workability of winding the sensor 50A onto the rim metal core 24C and the inner member 42 can be improved.

Note that, because other structures, operations and effects are substantially similar to those of the above-described first embodiment, description thereof is omitted.

The steering wheel of the present disclosure has been described above on the basis of the first embodiment and the second embodiment. However, specific structures are not limited to those of these embodiments, and changes in design and the like are permitted provided that they do not depart from the scope of the disclosures relating to the respective claims.

The first embodiment and the second embodiment describe examples in which the upper end of the sensor 50A is inserted in the second concave groove portion 48, and the sensor 50A spans over the first concave groove portion 46. However, the sensor may span over two or more of the first concave groove portions.

The first embodiment and the second embodiment describe examples in which the foamed body 56 has the cut-outs 56C at the peripheral edges of the portion thereof corresponding to the intermediate portion S3. However, the foamed body does not have to have the cut-outs.

The first embodiment and the second embodiment describe examples in which the convex portions 52D are formed so as to project-out in rectangular forms in the width direction W. However, the convex portions can be circular, polygonal, or other shapes.

The first embodiment and the second embodiment describe examples in which the sensor 50A has the sensor electrode 52 disposed at the obverse side of the foamed body 56, and the cancel electrode 54 that serves as an electrode and is disposed at the reverse surface side of the foamed body 56. However, the sensor does not have to be provided with a cancel electrode.

The first embodiment and the second embodiment describe examples in which the sensor electrode 52 has the convex portions 52D that project-out in the width direction W. However, convex portions may be provided at the insulating bodies or the cancel electrode, in conformance with the shape of the convex portions 52D of the sensor electrode 52.

The first embodiment and the second embodiment describe examples in which the convex portions 52D are provided at the both sides of the first concave groove portion 46 such that the first concave groove portion 46 is sandwiched therebetween. However, a convex portion may be provided at one side of the first concave groove portion.

The first embodiment and the second embodiment describe examples in which the convex portions 52D are provided at the width direction W both sides of the sensor electrode 52. However, convex portions may be provided at one side of the sensor electrode 52 in the width direction W.

The first embodiment and the second embodiment describe examples in which the sensor electrode 52 is formed in the shape of an elongated sheet that is substantially rectangular. However, the portion of the sensor electrode that is further toward the length direction E another end side than the first extending portion 52A may be divided into plural sections in the width direction W.

What is claimed is:

1. A steering wheel comprising:
   a detecting portion wound on a base portion that has a concave groove portion, the detecting portion being configured to detect contact of a person and having an electrode that is substantially rectangular,
   wherein the electrode comprises a convex portion that projects out along a width direction of the electrode, the width direction being orthogonal to a length direction of the electrode and a thickness direction of the electrode, and
   wherein, in a state in which the detecting portion having the electrode is wound on the base portion, the convex portion is disposed outside of and adjacent the concave groove portion in the length direction.

2. The steering wheel of claim 1, wherein:
   the convex portion projects out along the width direction from a middle portion in the length direction of the electrode.

3. The steering wheel of claim 2, wherein the length direction of the electrode corresponds to a peripheral direction of the base portion in the state in which the detecting portion having the electrode is wound on the base portion, the peripheral direction corresponding to a rotating direction of the steering wheel.

4. A steering wheel comprising:
   a detecting portion wound on a base portion that has a concave groove portion, the detecting portion being configured to detect contact of a person and having an electrode that is substantially rectangular,
   wherein the electrode comprises a convex portion that projects out along a width direction of the electrode, the width direction being orthogonal to a length direction of the electrode and a thickness direction of the electrode, and the electrode further comprises another convex portion that projects out along the width direction,
   wherein in the state in which the detecting portion having the electrode is wound on the base portion, the convex portion and the another convex portion are provided at opposite sides of the concave groove portion in the length direction and are disposed adjacent the concave groove portion in the length direction.

5. The steering wheel of claim 4, wherein the length direction of the electrode corresponds to a peripheral direction of the base portion in the state in which the detecting portion having the electrode is wound on the base portion, the peripheral direction corresponding to a rotating direction of the steering wheel.

6. The steering wheel of claim 5, wherein the convex portion and the another convex portion project out along the width direction from a substantially middle portion in the length direction of the electrode.

* * * * *